US 9,061,663 B2

(12) United States Patent
Wu (10) Patent No.: US 9,061,663 B2
(45) Date of Patent: Jun. 23, 2015

(54) TRAILER SWAY MITIGATION USING TORQUE VECTORING

(75) Inventor: Hsien-Cheng (Kevin) Wu, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 748 days.

(21) Appl. No.: 12/913,204

(22) Filed: Oct. 27, 2010

(65) Prior Publication Data
US 2012/0109471 A1 May 3, 2012

(51) Int. Cl.
G06F 7/00 (2006.01)
G06F 17/00 (2006.01)
G06F 19/00 (2011.01)
B60T 7/12 (2006.01)
G05D 1/00 (2006.01)
B60T 8/1755 (2006.01)
B60T 8/17 (2006.01)
B60W 30/02 (2012.01)

(52) U.S. Cl.
CPC ............ B60T 8/1755 (2013.01); B60T 8/1708 (2013.01); B60T 2230/06 (2013.01); B60W 30/02 (2013.01); B60W 2300/14 (2013.01); B60W 2720/14 (2013.01); B60W 2720/406 (2013.01); B60W 2720/22 (2013.01)

(58) Field of Classification Search
CPC ............ B60W 30/02; B60W 2720/22; B60W 2300/14; B60W 2720/14; B60W 2720/406
USPC .......................... 701/49, 69, 70, 84
See application file for complete search history.

(56) References Cited

U.S. PATENT DOCUMENTS

| 4,023,863 A | 5/1977 | Sisson et al. |
| 4,034,822 A | 7/1977 | Stedman |
| RE30,550 E | 3/1981 | Reise |
| 4,254,998 A | 3/1981 | Marshall et al. |
| 4,275,898 A | 6/1981 | Llambrich |
| 5,011,170 A | 4/1991 | Forbes et al. |

(Continued)

FOREIGN PATENT DOCUMENTS

| DE | 102005028787 | 5/2006 |
| EP | 1516792 | 3/2005 |

(Continued)

OTHER PUBLICATIONS

PCT/US2011/057799 International Search Report and Written Opinion dated May 4, 2012 (11 pages).

(Continued)

Primary Examiner — Imran Mustafa
(74) Attorney, Agent, or Firm — Michael Best Friedrich LLP (57) ABSTRACT

A system for stabilizing a sway of a trailer attached to a vehicle. In one embodiment, the system includes a controller, a plurality of sensors in electronic communication with the controller and transmitting sensor data to the controller, a torque vectoring device in electronic communication with the controller, and a computer readable memory storing instructions executed by the controller. The instructions cause the controller to evaluate the sensor data received from the sensors to determine a current vehicle yaw rate, a target vehicle yaw rate, and a yaw rate error of the vehicle. The instructions further cause the controller to determine if the vehicle is traveling in a straight line, to determine a torque distribution signal, and to transmit this signal to the torque vectoring device to stabilize the sway of the trailer without braking the vehicle.

26 Claims, 6 Drawing Sheets

(56) References Cited

U.S. PATENT DOCUMENTS

| | | |
|---|---|---|
| 5,671,982 A | 9/1997 | Wanke |
| 5,707,071 A | 1/1998 | Prestidge et al. |
| 5,747,683 A | 5/1998 | Gerum et al. |
| 5,799,745 A | 9/1998 | Fukatani |
| 5,986,544 A | 11/1999 | Kaisers et al. |
| 6,012,780 A | 1/2000 | Duvernay |
| 6,042,196 A | 3/2000 | Nakamura et al. |
| 6,074,020 A | 6/2000 | Takahashi et al. |
| 6,446,998 B1 | 9/2002 | Koenig et al. |
| 6,450,019 B1 | 9/2002 | Wetzel et al. |
| 6,498,977 B2 | 12/2002 | Wetzel et al. |
| 6,516,260 B2 | 2/2003 | Wetzel et al. |
| 6,522,956 B2 | 2/2003 | Hecker et al. |
| 6,523,911 B1 | 2/2003 | Rupp et al. |
| 6,550,810 B1 | 4/2003 | Bauer et al. |
| 6,600,974 B1 | 7/2003 | Trechtler |
| 6,655,710 B2 | 12/2003 | Lindell et al. |
| 6,668,225 B2 | 12/2003 | Oh et al. |
| 6,748,307 B1 | 6/2004 | Sala et al. |
| 6,940,026 B2 | 9/2005 | Rundell et al. |
| 6,959,970 B2 | 11/2005 | Tseng |
| 7,226,134 B2 | 6/2007 | Horn et al. |
| 7,272,481 B2 | 9/2007 | Einig et al. |
| 7,302,332 B2 | 11/2007 | Nenninger |
| 7,561,953 B2 | 7/2009 | Yu |
| 7,917,274 B2 | 3/2011 | Hackney et al. |
| 8,060,288 B2 | 11/2011 | Choby |
| 2004/0249547 A1 | 12/2004 | Nenninger |
| 2006/0033308 A1 | 2/2006 | Waldbauer et al. |
| 2006/0108781 A1 | 5/2006 | Giordano |
| 2006/0125313 A1 | 6/2006 | Gunne et al. |
| 2006/0155457 A1 | 7/2006 | Waldbauer et al. |
| 2006/0204347 A1 | 9/2006 | Waldbauer et al. |
| 2006/0229782 A1 | 10/2006 | Deng et al. |
| 2007/0260385 A1 | 11/2007 | Tandy, Jr. et al. |
| 2008/0036296 A1* | 2/2008 | Wu et al. ............. 303/146 |
| 2008/0172163 A1 | 7/2008 | Englert et al. |
| 2009/0005931 A1* | 1/2009 | Komatsu ............. 701/36 |
| 2009/0005946 A1 | 1/2009 | Futamura et al. |
| 2009/0093928 A1 | 4/2009 | Getman et al. |
| 2009/0105906 A1 | 4/2009 | Hackney et al. |
| 2009/0198425 A1 | 8/2009 | Englert |
| 2009/0210112 A1 | 8/2009 | Waldbauer et al. |
| 2009/0228182 A1 | 9/2009 | Waldbauer et al. |
| 2009/0242289 A1* | 10/2009 | Murty ............. 180/65.265 |
| 2009/0306861 A1 | 12/2009 | Schumann et al. |
| 2010/0203999 A1* | 8/2010 | Yokoo et al. ............. 475/223 |
| 2010/0211277 A1* | 8/2010 | Craig et al. ............. 701/70 |
| 2012/0053806 A1* | 3/2012 | Tronnberg et al. ............. 701/70 |

FOREIGN PATENT DOCUMENTS

| | | | |
|---|---|---|---|
| FR | 2856362 | 12/2004 | |
| GB | 2402453 | 12/2004 | |
| JP | 07164924 A * | 6/1995 | ............. B60K 41/04 |
| JP | 2005132360 | 5/2005 | |

OTHER PUBLICATIONS

Office Action from the Japanese Patent Office for Application No. 2009-524739 dated Jul. 13, 2012 (Translation only, 2 pages).

* cited by examiner

FIG. 6 ated in the following drawings. The invention is capable
TRAILER SWAY MITIGATION USING TORQUE VECTORING

FIELD

The present invention relates to systems for mitigating trailer sway. More specifically, embodiments of the invention relate to stabilizing trailer oscillation or sway in a vehicle towing system by using torque vectoring device without braking or slowing down the vehicle.

BACKGROUND

A trailer being towed by a tow vehicle can oscillate or sway back and forth for many different reasons and this sway can create vehicle stability problems. Some of the reasons that cause trailer sway include road conditions, traffic, weather conditions, load position, load quantity, and vehicle speed. Significant trailer sway can lift the rear end of a vehicle and push the vehicle to the side, significantly increasing the risk of loosing control of the vehicle and a rollover accident.

SUMMARY

While there are existing systems for controlling and mitigating trailer sway, they do not, in general, include systems that mitigate the trailer sway without braking or slowing down the vehicle.

Existing systems that detect and control trailer sway in vehicles generally control the brake system of the vehicle in order to brake the wheels of the trailer or the vehicle and to control the trailer sway. In this situation, the vehicle eventually slows down or stops. Trailer sway mitigation systems that rely on braking are sometimes abrupt in their level of driver intervention. Thus, drivers often find such systems disturbing or unsettling. In addition, some conventional vehicle systems transfer drive torque between the left and the right vehicle wheels when the vehicle is turning (e.g., when the vehicle is proceeding around a corner). However, trailer sway occurs not only during turning situations, but also when a vehicle is driving in a straight line (forward or backward). Accordingly, there is a need for an improved system and method for stabilizing trailer sway that transfers drive torque between the rear wheels using a torque vectoring device without slowing down or braking the vehicle.

The invention provides a system for stabilizing a sway of a trailer attached to a vehicle. The system includes a controller, a plurality of sensors in electronic communication with the controller and transmitting sensor data to the controller. A torque vectoring device is in electronic communication with the controller, and a computer readable memory stores instructions executed by the controller. The instructions cause the controller to evaluate the sensor data received from the sensors to determine a current vehicle yaw rate, a target vehicle yaw rate, and a yaw rate error of the vehicle. The instructions further cause the controller to determine if the vehicle is traveling in a straight line, to determine a torque distribution signal, and to transmit this signal to the torque vectoring device to stabilize the sway of the trailer without braking the vehicle.

The invention also provides a method for stabilizing a sway of a trailer attached to a vehicle. The method includes receiving sensor data from a plurality of sensors at a controller, evaluating the sensor data received from the sensors, determining a current vehicle yaw rate, a target vehicle yaw rate, and a yaw rate error of the vehicle. The method further includes determining if the vehicle is traveling in a straight line, determining a torque distribution signal, and transmitting the torque distribution signal to a torque vectoring device to stabilize the sway of the trailer without braking the vehicle.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
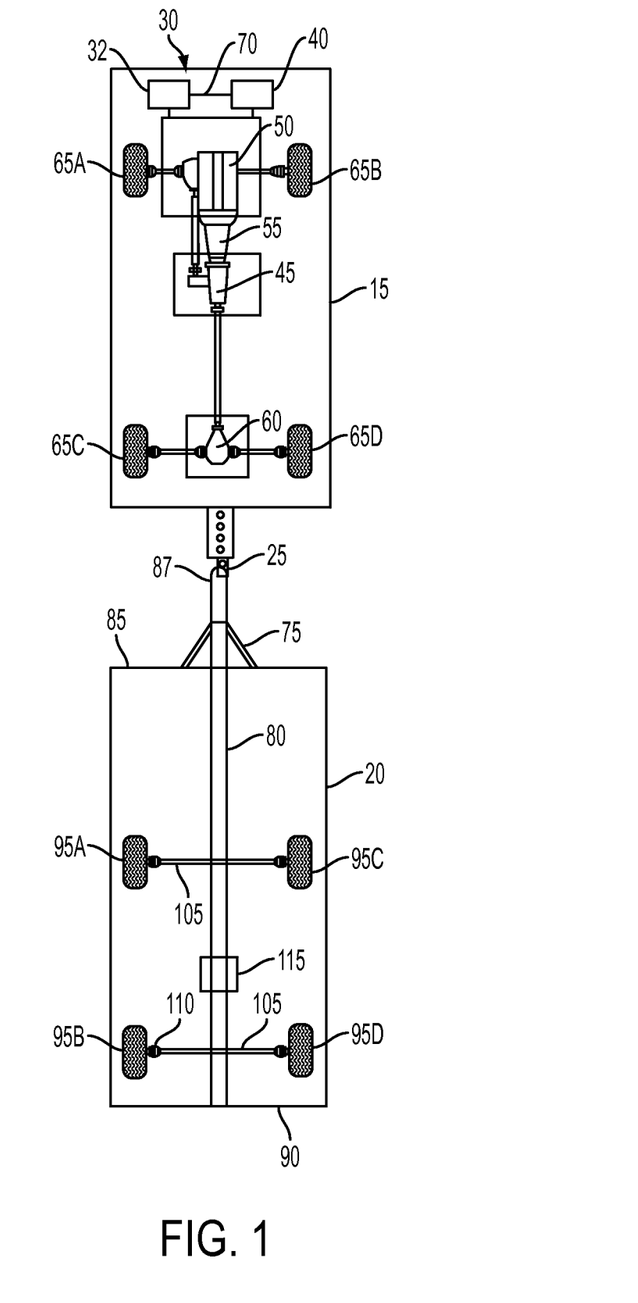
FIG. 1 illustrates a towing system including a system for stabilizing trailer sway according to embodiments of the invention.

FIG. 1 illustrates a towing vehicle 15 and a trailer 20. The vehicle 15 is coupled to the trailer 20 by a hitch system 25. In the example shown, the hitch system 25 includes a hitch ball and a ball receiver. In some embodiments, other hitching systems are used to couple to the tow vehicle 15 to the trailer 20. An operator (i.e., a driver) of the vehicle 15 operates a throttle and brake, and turns a steering wheel to direct the vehicle in a desired direction. A system 30 (described in greater detail below) for stabilizing trailer sway determines whether the trailer 20 is swaying and regulates the torque distributed to the wheels of the vehicle 15 in order to control the trailer sway without braking or stopping the vehicle 15 or the trailer 20. The process of detecting and determining trailer sway in vehicle towing systems is described in U.S. patent application Ser. No. 12/512,783, filed on Jul. 30, 2009 (which is incorporated herein by reference).

Figure 5:
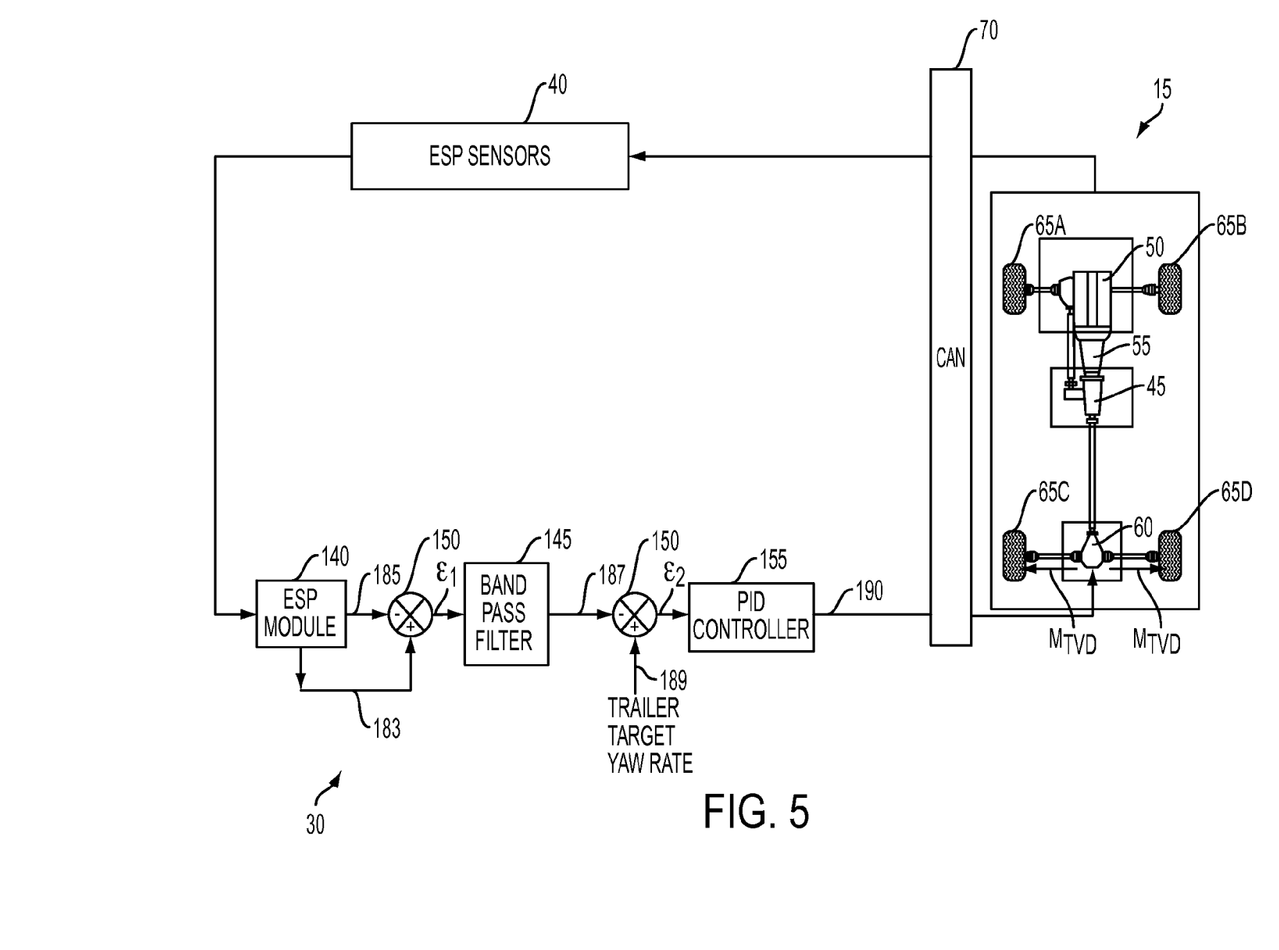
FIG. 5 illustrating the general operation of the system for stabilizing trailer sway.

As best illustrated in FIG. 5, the trailer sway stabilizing system 30 includes an Electronic Control Unit (ECU) (or controller) 32, a plurality of sensors 40, and a controllable four-wheel drive coupling device 45 connecting the engine 50 and the transmission 55 of the vehicle with a torque vectoring device 60. The vehicle 15 includes four wheels 65, where two of the wheels (65A and 65B) are located at the front end of the vehicle and the other two wheels (65C and 65D) are at the back end of the vehicle. The two back wheels 65C and 65D are mechanically connected to the torque vectoring device 60. The torque vectoring device 60 is operable to receive instructions from the controller 32 and to transfer drive torque between the back wheels 65C and 65D while the vehicle is moving in order to mitigate the sway created by the trailer 20. In an embodiment, the ESP controller of the Electronic Stability Program system ("ESP®") created by Robert Bosch is modified with software in accordance with the teachings herein and used as the controller 32.

The sensors 40 are used to sense current operating conditions of the vehicle 15 and provide information representative of the same to the controller 32. The sensors 40 transmit sensor measurement data in a defined data structure that can include analog data or digital data. These sensors 40 include one or more wheel speed sensors, yaw rate sensors, lateral acceleration sensors, steering angle sensors, and brake pressure sensors. In other embodiments, the vehicle 15 could include more or less sensors. In embodiments utilizing the ESP system, the sensors 40 are the sensors incorporated in that system. If the sensors are equipped with calibration circuitry or a processor, the sensors can internally convert the sensed conditions to a calibrated form. Otherwise, the sensed conditions can be converted into calibrated signals by other external processes, e.g., the ECU 32). The sensors 40 can be connected directly to the ECU 32 or connected to a network, such as a controller area network (CAN) bus 70, which is connected to the controller 32. The CAN bus 70 is connected to other vehicle systems.

As best shown in FIG. 1, the trailer 20 includes a frame 75 with a tongue 80, a front cross beam 85, and a rear cross beam 90. The tongue 80 includes a hitch ball receiver 87 at a first end and extends to the rear cross beam 90. The tongue is located at the approximate midpoint between the left wheels 95A/95B and the right wheels 95C/95D of the trailer 20. The left wheels 95A/95B and the right wheels 95C/95D are joined by axles 105. The trailer 20 can have different numbers of axles (e.g., two) (and, therefore, a different number of wheels), and can be a semi-trailer, a full-size trailer, a boat trailer, a camper, or the like. Attached to each wheels 95A and 95B are trailer brakes 110 used to supply braking force to the associated wheel. In embodiments using a hydraulic braking system, a hydraulic braking unit 115 is included on the trailer 20.

Figure 2:
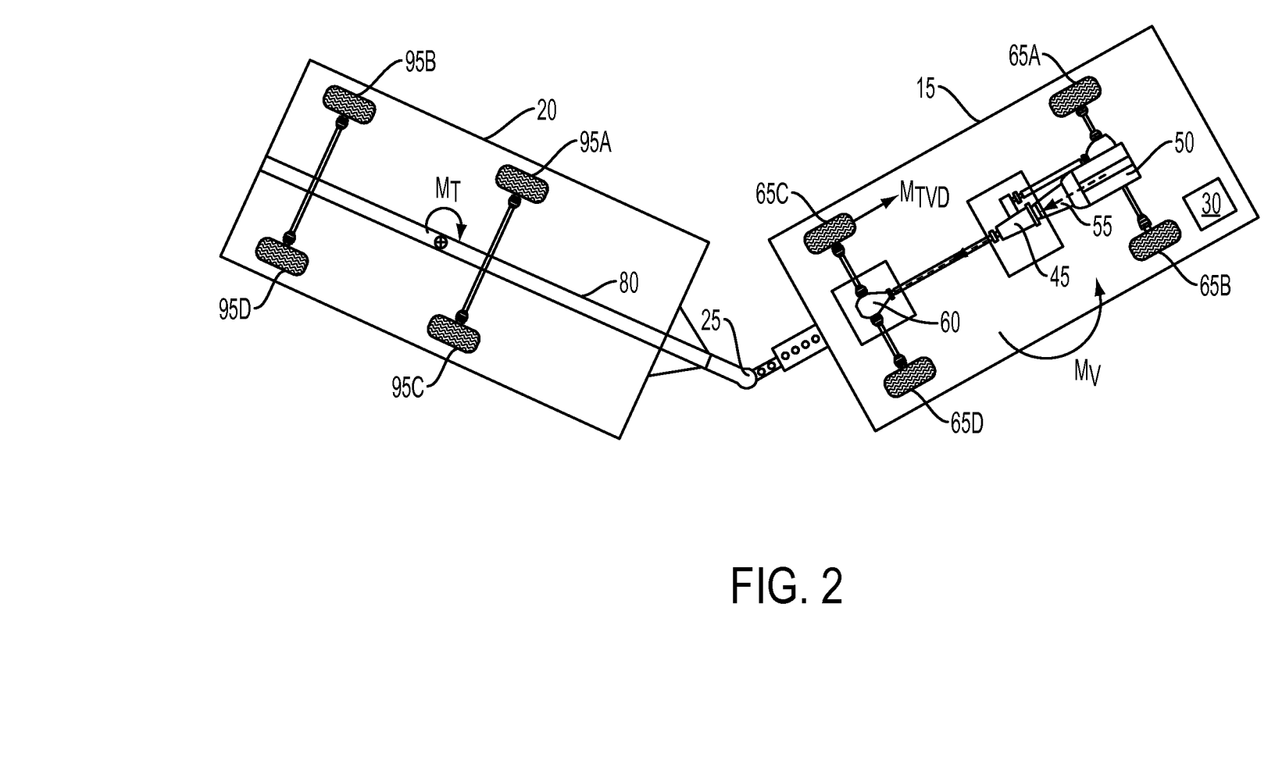
FIG. 2 illustrates one type of trailer sway of the towing system shown in FIG. 1.
Figure 3:
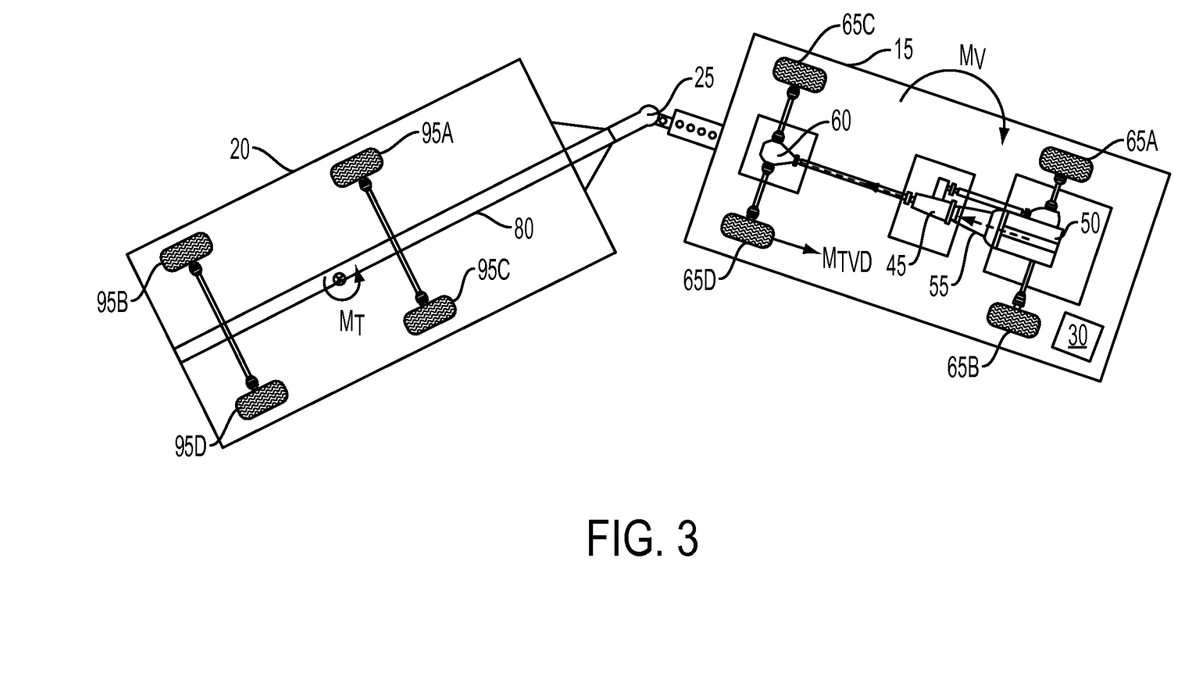
FIG. 3 illustrates another type of trailer sway of the towing system shown in FIG. 1.

FIGS. 2 and 3 illustrate some of the different sway variations of the trailer 20 that are controlled by the system 30. FIG. 2 shows a situation where the vehicle 15 is turning left (i.e., counterclockwise) and, consequently, because the hitching system 25 leads the trailer 20 in the direction of the vehicle, the trailer is also swaying to the left. Arrow $M_T$ illustrates the torque generated by the trailer 20 based on the trailer sway. The torque $M_T$ generated by the trailer sway is transferred to the vehicle 15 in the form of resultant vehicle torque $M_V$ that has a direction opposite to the direction of the trailer torque $M_T$. In order to balance out the vehicle torque $M_V$ created by the trailer 20 and to control the trailer sway, the system 30 distributes counter torque $M_{TVD}$ to the left back wheel 65C of the vehicle 15. The torque $M_{TVD}$ is generated by the engine 50 and is distributed by the torque vectoring device 60 in a process that is be described in more detail below.

FIG. 3. illustrates a situation where the vehicle 15 is turning right (i.e., clockwise) and, consequently, the trailer 20 is also swaying to the right. Arrow $M_T$ again represents the torque generated by the trailer 20 due to the trailer sway. The trailer sway torque $M_T$ is transferred to the vehicle 15 in the form of resultant vehicle torque $M_V$ that again has a direction opposite to the direction of the trailer torque $M_T$. In this situation, in order to balance out the vehicle torque $M_V$ created by the trailer 20 and to control the trailer sway, the system 30 uses the torque vectoring device 60 to distribute counter torque $M_{TVD}$ to the right back wheel 65D of the vehicle 15.

As noted, trailer oscillation can occur not only during turning situations but also when the vehicle 15 is driving in a straight line (forward or backward). Some of the reasons for this type of trailer sway include road conditions (e.g. driving over potholes, road bumps, or other objects on the road), traffic (e.g., sudden braking due to traffic congestion or accident), position and quantity of the load of the trailer 20, and the speed of the vehicle 15. As explained below, the system 30 is configured to regulate the trailer sway created while driving in a straight line or cornering without braking or slowing down the vehicle 15. The system 30 distributes torque between the back wheels 65C and 65D with the torque vectoring device 60.

Figure 4:
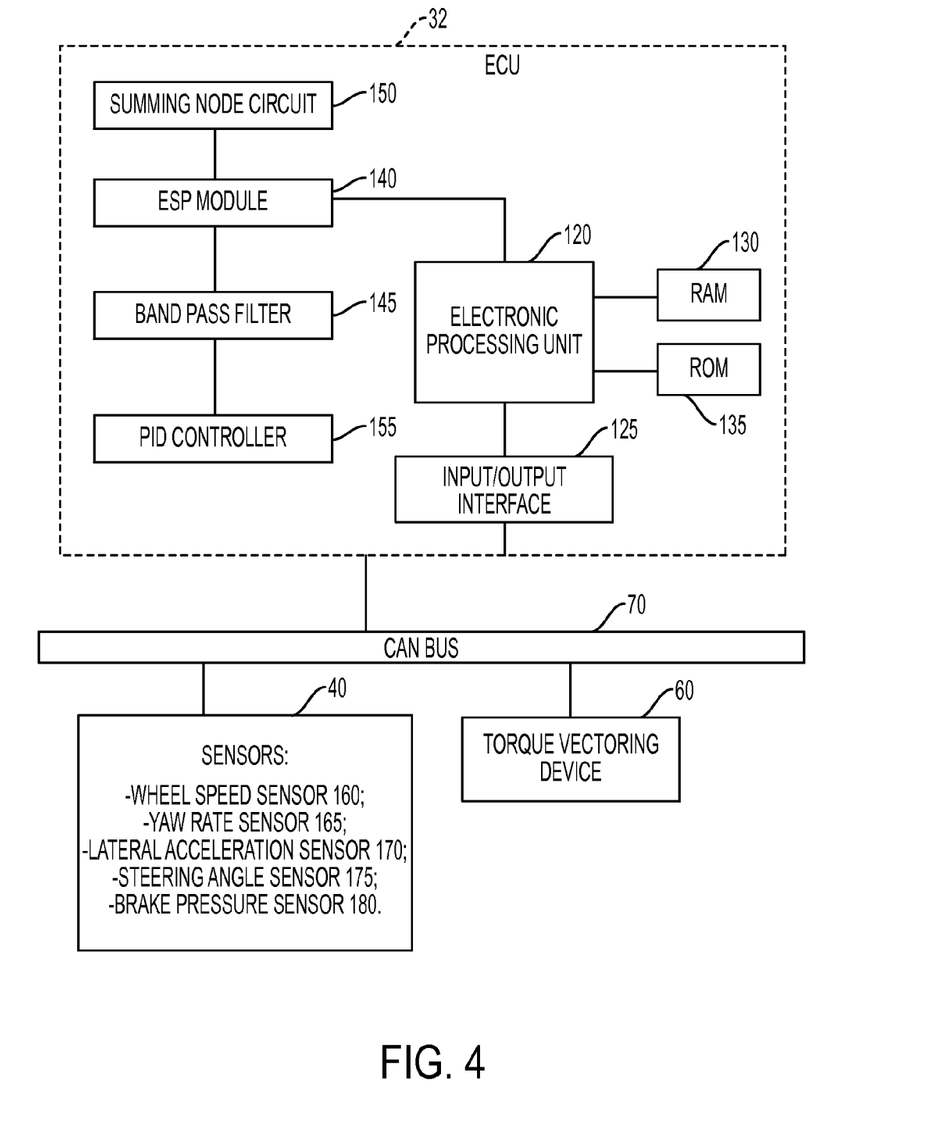
FIG. 4 illustrates the components and connections of a controller of the system for stabilizing trailer sway.

FIG. 4 schematically illustrates the components of the ECU 32 and the connections between the ECU 32, the sensors 40, the torque vectoring device 60, and the CAN bus 70. The controller 32 receives sensor readings (sensor data) from the sensors and processes that data with the controller 32 to stabilize the trailer sway. In some embodiments, the controller 32 obtains sensor readings directly from the sensors 40 rather than over the bus 70. In the illustrated embodiment, the system 30 includes a wheel speed sensor 160, a yaw rate sensor 165, a lateral acceleration sensor 170, a steering angle sensor 175, and a brake pressure sensor 180.

In the embodiment illustrated in FIG. 4, the controller 32 includes an EPU 120, an input/output interface 125, and one or more memory modules, such as a random access memory ("RAM") 130 and read-only memory ("ROM") 135. The EPU 120 is implemented as a microprocessor, microcontroller, or other programmable device (e.g., a field programmable gate array (FPGA), an application specific integrated circuit (ASIC), or the like). The EPU 120 executes software that can be stored in the RAM 130 (particularly during execution), the ROM 135 (on a generally permanent basis), or another non-transitory computer readable medium such as other memory or disc. If necessary, the microcontroller can be connected to such memory or a disc drive to read such software.

The RAM 130 and the ROM 135 can be internal to the processor 120, external to the processor 120, or a combination thereof. The EPU 120 sends information (e.g., information received from the bus 70 or information generated by the modules executed by the EPU 120) to the RAM 130. Further, the RAM 130 can receive and store data from other components of the system 30. While RAM 130 is used in the embodiment shown in FIG. 5, other memory devices can be also implemented. The controller 32 electronically communicates with the sensors 40 and the torque vectoring device 60 in order to regulate the trailer sway. The input/output interface 125 transmits and/or receives information over the bus 70, including sensor readings from the sensors 40.

The controller 32 also includes a variety of systems (e.g., in the form of hardware) and modules that are stored as instructions in a memory (e.g., RAM 130 or ROM 135) and are executed by the EPU 120. In one particular configuration, the controller 32 comprises an application or software module 140, a band-pass filter 145, a plurality of summing nodes circuits 150, and a proportional integral derivative ("PID") controller 155. In one embodiment, the software module 140 is the Software module of the ESP controller in Robert Bosch's ESP system.

As described in greater detail below, the software module 140 is a software program executed by the EPU 120 and is architected to evaluate the sensor data received from the sensors 40 to determine a current vehicle yaw rate, a target vehicle yaw rate, and a yaw rate error of the vehicle 15. Further, the software module 140 is architected to communicate with the other elements of the controller 32 (e.g., the band-pass filter 145 and the PID controller) to determine a trailer yaw rate and a torque distribution signal, and to transmit this torque distribution signal to the torque vectoring device 60. The torque vectoring device 60 is operable to distribute a compensatory wheel torque to the wheels 65 based on the torque distribution signal in order to stabilize the sway of the trailer.

The operation of the system 30 is illustrated in FIG. 5. The system 30 is configured to control and stabilize the sway of the trailer 20 pulled by the vehicle 15 while the vehicle is still moving by using the controller 32 and the torque vectoring device 60. Initially, the software module 140 of the controller 32 receives sensor readings from the sensors 40. The yaw rate sensor 165 measures the yaw rate of the vehicle 15 and the steering angle sensor 175 measures the steering angle of the steering wheel of the vehicle 15. These readings along with the other measured data is outputted to the software module 140 of the controller 32 as a digital or analog signal. In some embodiments, more than one yaw rate sensor 165 is used in order to provide redundancy in case of failure or error in one of the yaw rate sensors 165.

The software module 140 receives the sensor readings from the sensors 40 and is configured to process the received readings. As mentioned above, one of the inputs to the module 140 is the vehicle yaw rate 183 of the vehicle 15. Based on the sensor data, the software module 140 calculates the speed of the vehicle 15. Further, the software module 140 analyzes the information about the steering wheel angle received from the steering angle sensor 175. The module 140 determines whether the driver is actually steering the vehicle intentionally or the oscillation of the vehicle is based on the trailer sway. The module 140 further determines if the vehicle 15 is traveling in a straight line or is cornering. By using the determined vehicle speed, the vehicle yaw rate 183, and by evaluating the data from the sensors 40, the software module determines a target vehicle yaw rate 185. The target yaw rate 185 represents the driver-intended yaw rate of the vehicle 15 based on the analyzed characteristics.

Next, the controller 32 provides the target vehicle yaw rate 185 determined by the software module 140 to a first summing node circuit 150. The other input to the first summing node circuit 150 is the current vehicle yaw rate 183 filtered by the software module 140. The output from the first summing node circuit 150 is a yaw rate error signal $E_1$ that shows the difference between the target vehicle yaw rate 185 intended by the driver and the current vehicle yaw rate 183 measured by the system 30. The yaw rate error signal $E_1$ represents the level of input of the trailer sway to the vehicle yaw rate.

The determined yaw rate error signal $E_1$ is inputted into the band-pass filter 145. The band-pass filter 145 filters the yaw rate error signal $E_1$ and passes signals of specific frequency that are indicative of the trailer sway. This helps to distinguish between the actual trailer sway and driver assisted sway where the vehicle oscillates due to the fact that the driver intentionally cause the vehicle to turn by moving the steering wheel. For example, the band-pass filter 145 can be configured to filter the received signal and to pass signals that have frequencies between 0.5 Hz and 1.5 Hz. When the yaw rate error signal has very low or very high frequency, the system determines that this is not caused by the trailer sway. Such low or high frequencies of the yaw rate error signal can be created by driving fast or steering the vehicle by the driver.

The band-pass filter 145 outputs a signal 187 that represents the actual yaw rate of the trailer 20. That signal is inputted into a second summing node circuit 150. The second input to the second summing mode circuit 150 is a trailer target yaw rate 189. The value of the trailer target yaw rate 189 depends on the moving direction of the vehicle and the trailer. For example, when the vehicle and the trailer move in a straight direction, the trailer target yaw rate 189 is always a constant zero because the driver wants to move straight. Having the trailer target yaw rate 189 at a constant zero and summing it with the actual trailer yaw rate 187, allows the system 30 to control the actual trailer yaw rate 187, and consequently the trailer sway, based on the determined characteristics of the vehicle and the trailer. Further, when the vehicle and the trailer are cornering, the trailer yaw rate 187 is a specific value associated with the radius of cornering. The output of the second summing mode circuit 150 is an asymmetric controller signal $E_2$ that will bring the vehicle and the trailer to a steady state (e.g., driver intended state).

The outputted asymmetric controller signal $E_2$ can be different depending on the current traveling situation of the vehicle 15 and the trailer 20. For example, during cornering of the vehicle 15 the trailer 20 must sustain a certain yaw rate in order to make the corner along with the vehicle. In that case, the trailer target yaw rate 189 is greater than zero. The controller 32 evaluates the speed and the position of the vehicle 15 and the trailer 20, and determines the trailer target yaw rate needed for the trailer to make that corner. Based on that determination, the controller 32 outputs the appropriate asymmetric controller signal $E_2$ (a signal that is greater than zero). In another example, the controller 32 determines that the trailer must travel with no yaw rate at all (e.g., when the vehicle is driving straight) and it should not be oscillating at all. In that situation, trailer target yaw rate 189 is zero and the outputted asymmetric controller signal $E_2$ would require the system 30 to produce the appropriate amount of torque that would stabilize the trailer 20 completely.

The asymmetric controller signal $E_2$ output from the second summing node circuit 150 is input into the PID controller 155. The role of the PID controller is to amplify the asymmetric controller signal $E_2$ by converting it to a voltage signal. The PID controller 155 outputs a continuous asymmetric torque distribution signal 190 that is transmitted to the torque vectoring device 60. The continuous asymmetric torque distribution signal 190 includes information about the compensatory wheel torque that the torque vectoring device 60 needs to distribute to the back wheels of the vehicle 15 to stabilize the sway of the trailer. The torque transferred between the wheels of the vehicle 15 counters the trailer sway and stabilizes the trailer 20 without braking or slowing down the vehicle.

In some configurations, the torque vectoring device 60 includes a controller that executes software stored on a memory (elements not shown). The torque vectoring device 60 receives the continuous asymmetric torque distribution signal 190 and distributes compensatory wheel torque either to the left back wheel, the right back wheel, or both back wheels as directed by the signal 190 in order to stabilize the trailer sway. For example, the torque vectoring device 60 transfers torque from the right back wheel to the left back wheel (e.g., when the trailer sways to the left, FIG. 2). Further, the torque vectoring device 60 transfers torque from the left back wheel to the right back wheel (e.g., when the trailer sways to the right, FIG. 3). Further, the torque vectoring device 60 transfers torque to both, the right and the left back when necessary (e.g., when the trailer sways to the left and the to the right but the vehicle is traveling straight, FIG. 1).

In an embodiment, the torque vectoring device 60 needs additional compensatory wheel torque in order to control the trailer sway. The torque vectoring device 60 does not produce any torque on its own but only distributes torque based on the asymmetric torque distribution signal 190. The additional torque is generally produced or generated by the engine 50. The torque vectoring device 60 sends a compensatory wheel torque request to the four-wheel drive coupling device 45 based on the torque distribution signal 190. The four-wheel drive coupling device 45 includes a controller that executes software stored on a memory and determines how much torque is currently transferred from the engine 50 to the torque vectoring device 60. Based on that determination and the request from the torque vectoring device 60, the four-wheel drive coupling device 45 transfers the necessary torque from the engine 50 to the torque vectoring device 60.

The transfer and control of torque from the torque vectoring device 60 to the back wheels 65B is completed, in one configuration, by using a clutch plate (not shown). The amount of torque transmitted to the clutch plate from the engine 50 is regulated by the torque vectoring device 60 and the clutch plate distributes the torque to an input shaft that drives an output shaft, which distributes the torque to the wheels 65B. In another embodiment, the transfer and control of torque is completed by using a motor (not shown) that connects the torque vectoring device 60 and the back wheels 65B.

Figure 6:
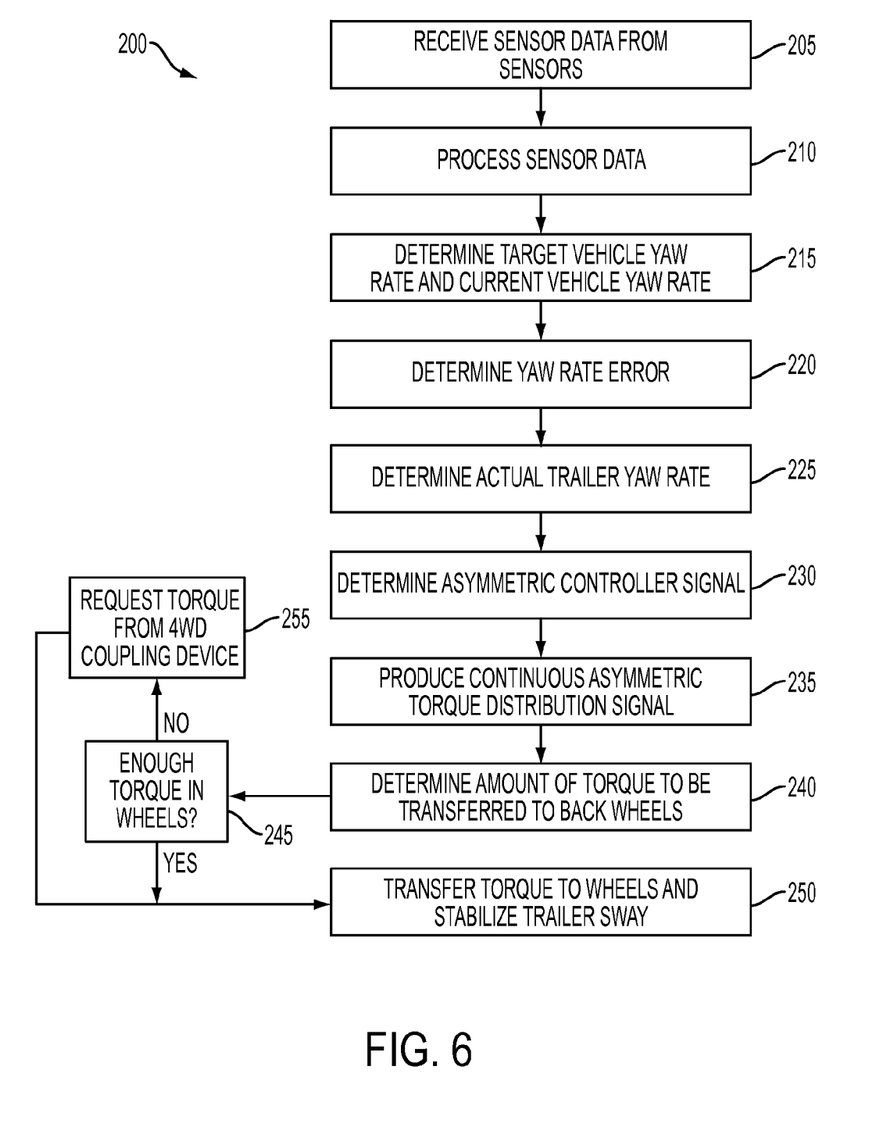
FIG. 6 illustrates a method for stabilizing the sway of a trailer using the system for stabilizing trailer sway.

FIG. 6 illustrates a method 200 of stabilizing the trailer sway of a trailer 20 during the movement of the vehicle 15 by using the system 30. In some embodiments, the method 200 is carried out by the ECU 32 shown in FIG. 2. The controller 32 of the system 30 receives sensor data from the sensors 40 (step 205) and the controller 32 processes the sensor data using the software module 140 (step 210). The software module 140 determines if the vehicle 15 is traveling in a straight line or is cornering, the target vehicle yaw rate 185, and the current vehicle yaw rate 183 based on the sensor data (step 215). In the next step, the system 30 uses the first summing node circuit 150 to determine a yaw rate error $E_1$ that indicates the difference between the driver intended target vehicle yaw rate 185 and the current vehicle yaw rate 183 (step 220).

Next, the system 30 determines the actual trailer yaw rate 187 of the trailer 20 by passing the yaw rate error signal $E_1$ through the band-pass filter 145 (step 225). Then, the system 30 determines the asymmetric controller signal $E_2$ by using the second summing node circuit 150 that inputs the actual trailer yaw rate 187 and the trailer target yaw rate 189 that is equal to zero (when driving straight) or is greater than zero (when cornering) (step 230). Using the PID controller 155, the system transforms the asymmetric controller signal $E_2$ and produces the continuous asymmetric torque distribution signal 190 that is provided to the torque vectoring device 60 in order to stabilize the oscillation of the trailer without braking the vehicle (step 235).

The torque vectoring device 60 analyzes the torque distribution signal 190 and determines the amount of torque that needs to be transferred to the back wheels (step 240). If the torque vectoring device 60 determines that the amount of torque that is currently available in the back wheels is sufficient to stabilize the trailer sway (step 245), the torque vectoring device 60 transfers the torque between the wheels as directed by the torque distribution signal 190 (step 250). The transferred torque counters the trailer sway and stabilizes the trailer 20. If the torque vectoring device 60 determines that the amount of torque that is currently available in the back wheels is insufficient to stabilize the trailer sway (step 245), the torque vectoring device 60 requests additional torque from the controllable four-wheel drive coupling device 45 (step 255). When torque vectoring device 60 receives the necessary torque from the engine 50 via the four-wheel drive coupling device 45, the torque vectoring device 60 transfers the torque to the wheels and stabilizes the sway of the trailer (step 250).

Various features and advantages of the invention are set forth in the following claims.

What is claimed is:

1. A system for stabilizing a sway of a trailer attached to a vehicle, the system comprising:
   a first controller;
   a plurality of sensors in electronic communication with the first controller, each of the sensors transmitting sensor data to the first controller;
   a first non-transitory computer readable memory storing instructions that, when executed by the first controller, cause the first controller to:
   evaluate the sensor data received from the sensors to determine a current vehicle yaw rate, a target vehicle yaw rate, and a yaw rate error of the vehicle,
   determine if the vehicle is traveling in a straight line,
   determine a torque distribution signal, wherein the torque distribution signal indicates an increased torque to be applied to a first rear wheel of the vehicle when the current vehicle yaw rate exceeds the target vehicle yaw rate and indicates an increased torque to be applied to a second rear wheel when the target vehicle yaw rate exceeds the current vehicle yaw rate, and
   transmit the torque distribution signal to a torque vectoring device; and
   the torque vectoring device, wherein the torque vectoring device is configured to stabilize the sway of the trailer without braking the vehicle and includes
   a second controller in electronic communication with the first controller, and
   a second non-transitory computer readable memory storing instructions that, when executed by the second controller, cause the second controller to:
   apply torque to the first rear wheel and the second rear wheel based on the torque distribution signal, and
   request additional compensatory torque from a vehicle engine based on the torque distribution signal and an amount of torque that is currently available in the first rear wheel and the second rear wheel of the vehicle.

2. The system of claim 1, wherein the first non-transitory computer readable memory further stores instructions, when executed by the first controller, determines the current vehicle yaw rate and the target vehicle yaw rate.

3. The system of claim 1 further comprising a first summing node circuit that calculates a difference between the target vehicle yaw rate and current vehicle yaw rate, and determines the yaw rate error.

4. The system of claim 1 further comprising a band-pass filter that filters the yaw rate error to determine an actual trailer yaw rate.

5. The system of claim 4 further comprising a second summing node circuit that determines an asymmetric controller signal by using the actual trailer yaw rate and a trailer target yaw rate.

6. The system of claim 5 further comprising a proportional integral derivative controller that receives the asymmetric controller signal and outputs the torque distribution signal to the torque vectoring device.

7. The system of claim 1, wherein the torque distribution signal includes information about a compensatory wheel torque that the torque vectoring device distributes to one or more vehicle wheels to stabilize the sway of the trailer.

8. The system of claim 1, wherein the torque vectoring device sends a compensatory wheel torque request to a controllable four-wheel drive coupling device based on the torque distribution signal.

9. The system of claim 8, wherein a compensatory wheel torque is generated by an engine and is transferred to the torque vectoring device by the controllable four-wheel drive coupling device.

10. A method for stabilizing a sway of a trailer attached to a vehicle, the method comprising:
receiving sensor data from a plurality of sensors at a controller;
evaluating the sensor data received from the sensors;
determining a current vehicle yaw rate, a target vehicle yaw rate, and a yaw rate error of the vehicle;
determining if the vehicle is traveling in a straight line;
determining a torque distribution signal;
transmitting the torque distribution signal to a torque vectoring device; and
stabilizing the sway of the trailer without braking the vehicle, based on the torque distribution signal received by the torque vectoring device, by
applying an increased torque to a first rear wheel of the vehicle when the current vehicle yaw rate exceeds the target vehicle yaw rate,
applying an increased torque to a second rear wheel of the vehicle when the target vehicle yaw rate exceeds the current vehicle yaw rate, and
requesting additional compensatory torque from a vehicle engine based in part on the torque distribution signal and an amount of torque that is currently available in the first rear wheel and the second rear wheel of the vehicle.

11. The method of claim 10, wherein determining the current vehicle yaw rate and the target vehicle yaw rate further includes executing a software module and determining the yaw rate error further includes executing a first summing node circuit.

12. The method of claim 10, further comprising determining an actual yaw rate of the trailer by using a band-pass filter to filter the yaw rate error.

13. The method of claim 12, further comprising determining an asymmetric controller signal by using a second summing node circuit that inputs the actual trailer yaw rate and a trailer target yaw rate.

14. The method of claim 10, further comprising providing information about a compensatory wheel torque that the torque vectoring device distributes to one or more vehicle wheels to stabilize the sway of the trailer, wherein this information is included in the torque distribution signal.

15. The method of claim 14, further comprising distributing the compensatory wheel torque to a left back wheel, a right back wheel, or to both back wheels.

16. The method of claim 14, further comprising transferring the compensatory wheel torque from the right back wheel to the left back wheel.

17. The method of claim 14, further comprising transferring the compensatory wheel torque from the left back wheel to the right back wheel.

18. The method of claim 10, further comprising sending a compensatory wheel torque request to a controllable four-wheel drive coupling device based on the torque distribution signal.

19. The method of claim 18, further comprising generating a compensatory wheel torque by an engine and transferring the compensatory wheel torque to the torque vectoring device by the controllable four-wheel drive coupling device.

20. The system of claim 1, wherein the torque vectoring device is configured to transmit a request for the additional compensatory torque from the vehicle engine and to apply the increased torque to the first rear wheel of the vehicle by applying the additional compensatory torque to the first rear wheel of the vehicle.

21. The system of claim 1, wherein the torque vectoring device is configured to apply the increased torque to the first rear wheel by transferring torque from the second rear wheel to the first rear wheel of the vehicle.

22. The system of claim 21, wherein the torque vectoring device is configured to transmit a request for the additional compensatory torque from the vehicle engine when the torque transferred from the second rear wheel to the first rear wheel is insufficient to generate the increased torque on the first rear wheel in accordance with the torque distribution signal and to apply the increased torque to the first rear wheel of the vehicle by applying the additional compensatory torque and the torque transferred from the second rear wheel to the first rear wheel of the vehicle.

23. The method of claim 10, further comprising transmitting a request for the additional compensatory torque from the vehicle engine, and wherein the torque vectoring device applies the increased torque to the first rear wheel of the vehicle by applying the additional compensatory torque to the first rear wheel of the vehicle.

24. The method of claim 10, wherein the torque vectoring device applies the increased torque to the first rear wheel of the vehicle by transferring torque from the second rear wheel to the first rear wheel of the vehicle.

25. The method of claim 24, further comprising transmitting a request for the additional compensatory torque from the vehicle engine when the torque transferred from the second rear wheel to the first rear wheel is insufficient to generate the increased torque on the first rear wheel in accordance with the torque distribution signal, and wherein the torque vectoring device applies the increased torque to the first rear wheel of the vehicle by applying the additional compensatory torque and the torque transferred from the second rear wheel to the first rear wheel of the vehicle.

26. A method for stabilizing sway of a trailer attached to a vehicle, the method comprising:
determining an actual yaw rate and a target yaw rate;
determining a torque distribution signal based on the actual yaw rate and the target yaw rate;
transferring torque from a left rear wheel of the vehicle to a right rear wheel of the vehicle based on the torque distribution signal when the actual yaw rate exceeds the target yaw rate and the vehicle is turning left;
transferring torque from the right rear wheel of the vehicle to the left rear wheel of the vehicle based on the torque distribution signal when the target yaw rate exceeds the actual yaw rate and the vehicle is turning left;
transferring torque from the right rear wheel of the vehicle to the left rear wheel of the vehicle based on the torque distribution signal when the actual yaw rate exceeds the target yaw rate and the vehicle is turning right;
transferring torque from the left rear wheel of the vehicle to the right rear wheel of the vehicle based on the torque distribution signal when the target yaw rate exceeds the actual yaw rate and the vehicle is turning right; and
requesting additional compensatory torque from a vehicle engine based in part on the torque distribution signal and an amount of torque that is currently available in the first rear wheel and the second rear wheel of the vehicle.

* * * * *